United States Patent [19]
Izenbaard et al.

[11] Patent Number: 5,187,422
[45] Date of Patent: Feb. 16, 1993

[54] CHARGER FOR BATTERIES OF DIFFERENT TYPE

[75] Inventors: John M. Izenbaard, Vicksburg; Christopher D. Philipp, Portage; Michael W. Steffler, Kalamazoo, all of Mich.

[73] Assignee: Stryker Corporation, Kalamazoo, Mich.

[21] Appl. No.: 738,526

[22] Filed: Jul. 31, 1991

[51] Int. Cl.$^5$ .................. H02J 7/00; H01M 10/46
[52] U.S. Cl. .................................... 320/2; 320/15
[58] Field of Search ............... 320/2, 6, 15, 22, 23, 320/24; 429/96, 97, 98, 99, 100

[56] References Cited

U.S. PATENT DOCUMENTS

| | | | |
|---|---|---|---|
| 4,816,735 | 3/1989 | Cook et al. | 320/2 |
| 4,873,479 | 10/1989 | Iimura et al. | 320/2 |
| 4,963,812 | 10/1990 | Mischenko et al. | 320/2 |
| 5,038,093 | 8/1991 | Edwards et al. | 320/2 |
| 5,057,761 | 10/1991 | Felegyhazi, Sr. | 320/2 |
| 5,059,885 | 10/1991 | Weiss et al. | 320/2 |
| 5,065,082 | 11/1991 | Fushiya | 320/2 |

OTHER PUBLICATIONS

Stryker Instruments "System II Two and Four Pocket Chargers" Maintenance Manual & Operating Instructions 298-104-11 Rev-C.

Primary Examiner—Steven L. Stephan
Assistant Examiner—Kristine Peckman
Attorney, Agent, or Firm—Flynn, Thiel, Boutell & Tanis

[57] ABSTRACT

A battery charger for alternately receiving batteries having substantially different charging rate requirements in which the charger has contacts engaged by a battery pack to be recharged, for the purpose of carrying out such recharging. A difference in at least one of the charger contacts is engageable by one of the high and low charge rate battery packs, but not the other. Whether or not that one charger contact is engaged by a battery pack causes the battery charger to supply charging current at different levels to automatically charge such high and low charge rate battery packs at corresponding high and low charge rates.

6 Claims, 3 Drawing Sheets

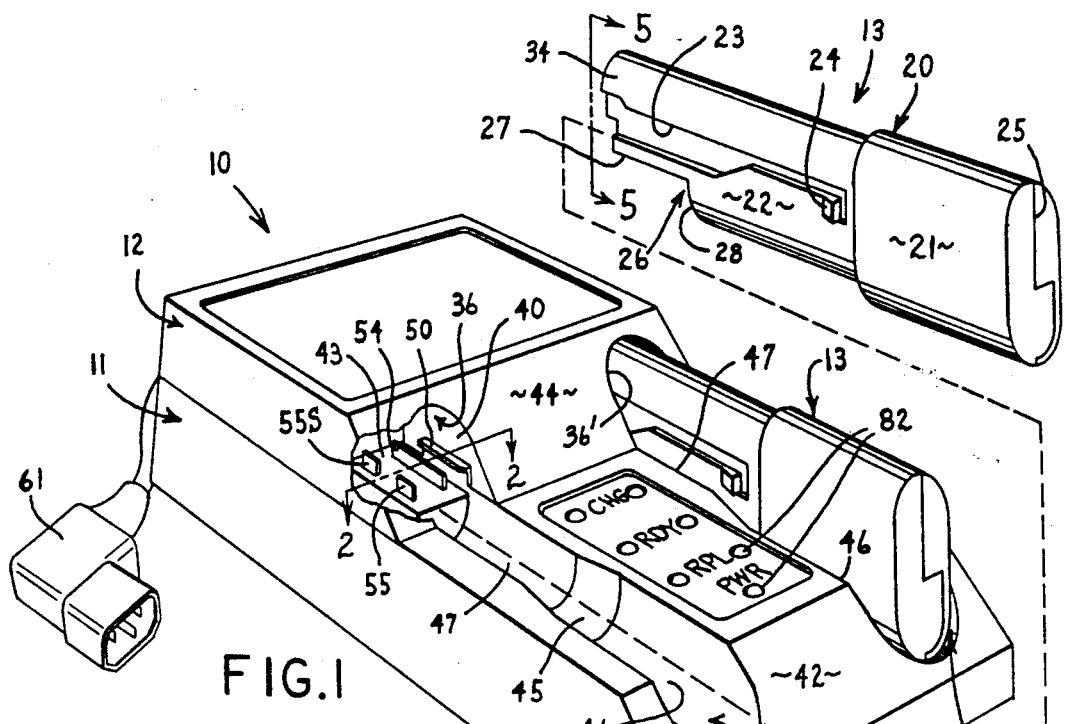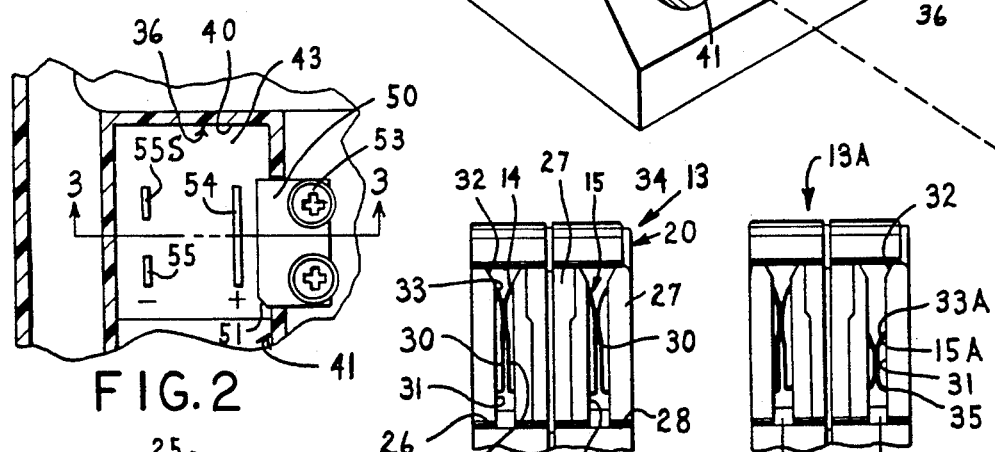

CHARGER FOR BATTERIES OF DIFFERENT TYPE

FIELD OF THE INVENTION

This invention relates to rechargeable batteries for battery powered surgical tools (handpieces) and a battery charger compatible therewith.

BACKGROUND OF THE INVENTION

The assignee of the present invention has for some time sold multiple pocket, microprocessor controlled, chargers for relatively rapid (less than one hour) charging of battery packs for battery powered surgical tools. Examples are the present assignee's System II charger Models 298101 through 298106 available from Stryker Corporation of Kalamazoo, Mich. Such chargers are variously provided with two or four battery receiving pockets. These chargers incorporate microprocessor controlled charging circuitry which, in addition to charging such battery packs, is capable of testing and displaying various conditions of each battery pack inserted therein, namely that the battery pack is faulty and requires replacement, the battery pack is in the process of being charged or the battery pack has been charged and is ready for removal from the charger and use in the corresponding surgical tool. The displays are, for each pocket, energizable lights labelled "REPLACE", "CHARGE", and "READY".

A battery pack of the kind included in this prior system is insertable into each of a family of surgical power tools, for example wire drivers, drills, reamers, and various saws, to power same for use in a variety of surgical procedures.

In general, the aforementioned surgical tool battery and battery charger system has performed satisfactorily. However, in a continuing effort to improve, the present invention has been developed.

As one aspect of the present invention, the present inventors have noted the following. Different types of battery operated surgical tools have sharply differing energy requirements. On the other hand, it is desirable to have each battery plug into the handle of all of the surgical power tools in the family. For example, tools such as a wire driver or a sternum saw are typically only used for a very short time in a given surgical procedure (typically a minute or so for a wire driver and 10 to 20 seconds for a sternum saw). It is desirable for such small energy requiring surgical tools to be able to use a battery pack which has a lesser charge storage capacity, namely one with fewer battery cells and a physically smaller size. Some other battery operated surgical tools are used for a considerably longer time in a given surgical procedure and may in some instances be required to use energy faster in carrying out their part of the surgical procedure. In those surgical tools, greater energy storage capacity is required, thereby requiring the battery pack to contain more battery cells and hence to be physically larger, having a larger rear portion.

Moreover, the present inventors have found that surgeons wish to be able to recharge a battery for any surgical power tool in the family in no more than an hour, regardless of the level of energy demand for the particular tool which they plan to use. However, it is possible to damage a battery pack, particularly of nickel cadmium (NiCad) type, if a battery pack of low energy storage capacity is charged at an amperage which would be optimal for charging a NiCad battery pack of larger energy storage capability. On the other hand, it would unduly delay charging of a NiCad battery pack of larger energy storage capacity, to charge same at an optimum rate for a NiCad battery pack of substantially lower energy storage capacity. This problem is true when, for example, battery packs normally rated at 500 and 1,000 milliampere hour storage capacity are to be used with different members of the same surgical power tool family (e.g. wire drivers, saws, drills and reamers for example). Moreover, surgeons and their support staffs are of course expected to direct their primary attention at the surgical problems involved in a particular surgical procedure, rather than being expected to be expert in the art of battery charging or to pay attention to charging requirements of different capacity battery packs.

It is an object of the present invention to overcome this set of conflicting problems. Purposes of various aspects of the present invention are to provide battery packs of widely differing energy storage capability all shaped for reception in the common handle-configuration found in a family of different, battery powered, surgical tools and all alternatively receivable in a single battery charger, which charger is capable of differentiating between relatively high and relatively low energy storage battery packs and automatically, without need for instruction from the surgeon or his staff, recharging differing battery packs each at its own optimum charge rate, so as to permit charging of all of the differing battery packs in a short required time (such as an hour) without damaging the smaller energy storage capacity battery packs.

Other objects and purposes of the invention will be apparent to persons acquainted with apparatus of this general type upon reading the following specification and inspecting the accompanying drawings.

According to one embodiment of the present invention, there is provided a battery charger for alternately receiving batteries having substantially different charging rate requirements in which the charger has contacts engaged by a battery pack to be recharged, for the purpose of carrying out such recharging. However, there is a difference in at least one of the contacts as between the high and low charge rate battery packs such that the battery charger automatically applies charging current at different levels to differing battery packs, so as to automatically charge the high and low energy storage capacity battery packs at corresponding high and low charge rates.

BRIEF DESCRIPTION OF THE DRAWINGS

FIG. 1 is a partly broken pictorial view of a battery charger and a pair of batteries insertable therein for charging.

FIG. 2 is an enlarged fragmentary top view of a forward portion of the base of the battery charger of FIG. 1, with the cover removed to show the upward opening battery receiving groove.

FIG. 3 is a fragmentary sectional view substantially taken on the line 3—3 of FIG. 2.

FIG. 4 is a fragmentary sectional view substantially taken on the line 4—4 of FIG. 3 and showing a contact blade for electrical contact with a corresponding spring contact on a battery pack to be charged.

FIG. 5 is a front elevational view of a typical battery pack and substantially corresponding to the line 5—5 of FIG. 1.

FIG. 6 is a fragmentary sectional view substantially taken on the line 6—6 of FIG. 5.

FIG. 7 is a view similar to FIG. 6 but showing an alternative battery pack having a different charge capacity.

DETAILED DESCRIPTION

Figure 8:
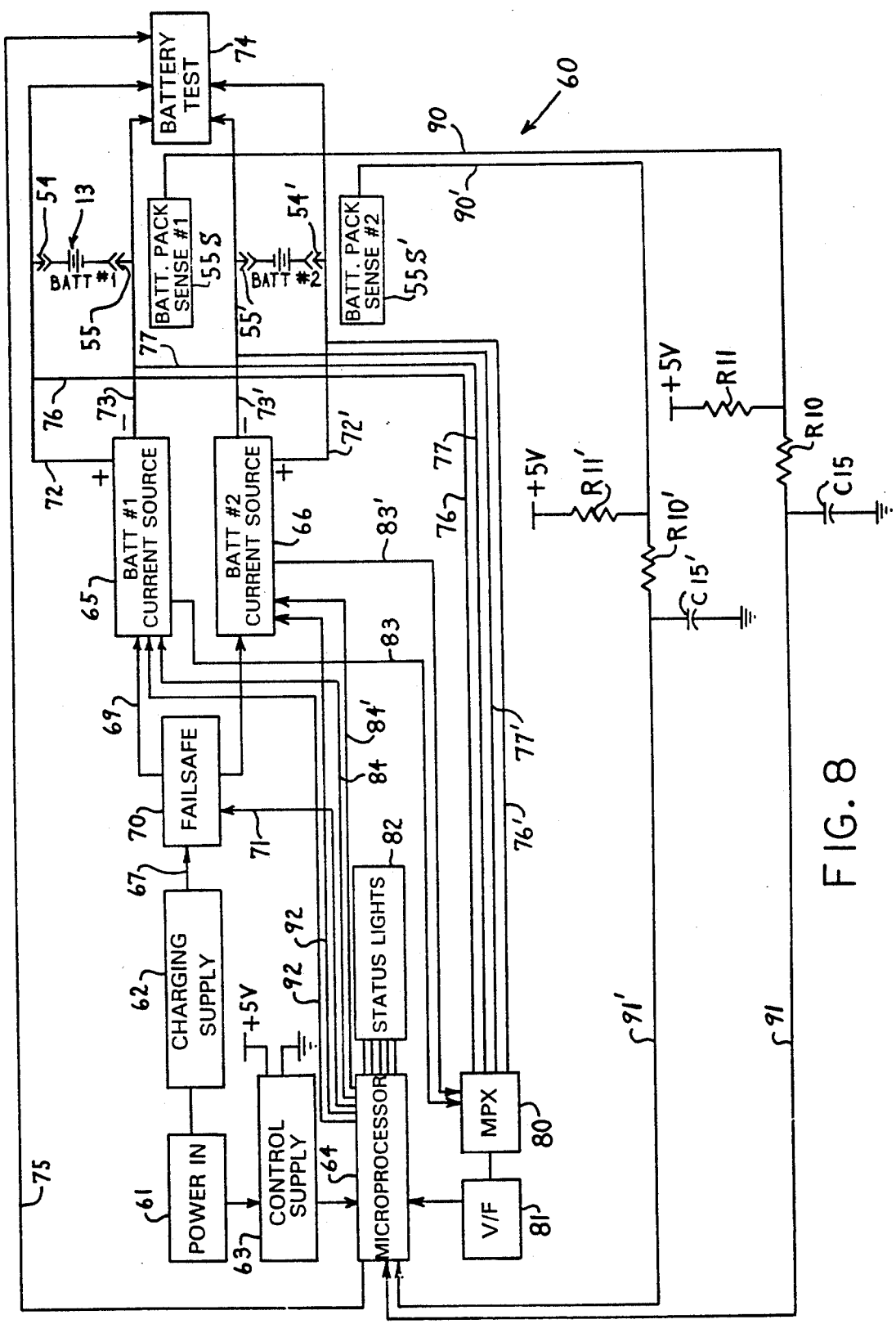
FIG. 8 is a schematic diagram of a charging circuit for the battery charger of FIG. 1.

A battery charger 10 (FIG. 1) comprises a base 11 forming a hollow housing containing a charging circuit 60, such as that shown in FIG. 8. A cover 12, which is preferably hollow, overlies the forward (leftward in FIG. 1) end portion of the base 11 and is removably affixed thereto by any convenient means not shown. The base 11 and cover 12 may be of any conventional construction, for example, hollow molded bodies of conventional rigid plastics materials.

The battery charger 10 is adapted to recharge battery packs 13, for example, one or two at a time. The battery packs 13 may be of the type used in battery powered surgical tools and, for example, be of the kind shown in co-pending Application Serial No. 07/722 011 Attorney's Reference: Stryker Case 77 and assigned to the assignee of the present invention. In the embodiment here shown, the battery packs 13 each comprise battery cells suitably connected together as and forming a battery as shown schematically at B in FIG. 5, and to provide a desired voltage. Opposite ends of the battery B are connected by any convenient means (schematically shown in dotted lines in FIG. 5) to respective sets of electrically conductive spring contacts 14 and 15. The spring contacts 14 and 15 are exposed for removable electrical connection with corresponding terminals (not shown) on suitable surgical, battery-powered handpieces (not shown), for example, of the type shown in the aforementioned co-pending application. The spring contacts 14 and 15 are also exposed for electrical contact with suitable contact blades, hereafter described, of the battery charger 10.

In more detail, a given battery pack 13, shown in FIGS. 1, 5, and 6, comprises an exterior casing 20 of rigid material, preferably a rigid molded plastics material. The casing 20 rigidly supports the contacts 14 and 15 and houses therein the rechargeable cells, here conventional nickel-cadmium cells, which are conventionally connected to each other to define the battery B across the spring contacts 14 and 15. The battery B can thus supply a desired voltage across such contacts 14 and 15. The contacts can thus supply operating current to the motor (not shown) of a surgical handpiece (not shown) and, alternatively, can receive charging current from the battery charger 10 as hereafter more fully described.

As seen in FIGS. 1 and 5, the battery pack casing 20 here includes a substantially oval cross section, cylindrical rear portion 21 and a forward portion 22 of cross section similar to the rear portion 21 but of somewhat reduced thickness and width. In the embodiment shown, the forward portion 22 has a leftward facing and forward extending groove 23 and leftward facing protrusion 24, which are not related to the battery charger 10 but may be provided for assisting securement of the battery pack temporarily in a surgical handpiece (tool) of the kind mentioned above.

In a preferred embodiment, the battery pack casing 20 is constructed of two parts, assembled in facing relation to each other along a parting line generally indicated at 25, for example, as a convenient way to enable reception therein of the battery B mentioned above.

In the preferred battery pack 13 shown, the casing 20 has a forward and downward opening notch 26 formed therein and defined by bottom and forward faces 27 and 28 (FIGS. 1 and 5). The spring contacts 14 and 15 each comprise a resiliently contacting pair of electrically conductive, leaf spring elements 30. Each leaf spring elements pair 14 and 15 is fixedly located within a corresponding forward and downward opening undercut groove 31 in the bottom face 27 of the notch 26 at the forward end of the battery pack casing 20. As seen in FIG. 6, the leaf spring elements 30, of each spring contact 14 and 15, bow resiliently toward and into contact with each other, when the corresponding battery pack 13 is free of contact with the battery charger 10 (or a battery powered surgical handpiece, not shown). The leaf spring elements 30 are free to spring laterally apart from each other upon reception into contact therebetween of a contact blade, or blades, of the charger 10, as hereafter discussed. The rear ends of the leaf spring elements 30 are suitably fixed on the battery pack casing 20, by any conventional means (FIG. 6). Each undercut groove 31 preferably has a divergent or funnel-like, forwardly widening mouth 32 (FIG. 6) at the forward end thereof. Similarly, the leaf spring elements 30 defining the contact 14 (and similarly the contact 15) have front ends diverging to form a similar funnel-like mouth 33 near the mouth 32. The mouths 32 and 33 are intended to facilitate reception into the forward ends of each groove 31 and corresponding leaf spring contact 14 or 15 of the charger blades hereafter described.

In the embodiment shown, casing 20 has a nose 34 along the top edge thereof and spaced somewhat above the notch 26 and extending somewhat forward therefrom to overhang the front end of the mouths 32 and 33 of the undercut grooves 31.

Battery packs 13 of different charge capacities, for example, 500 milliampere hours and 1,000 milliampere hours, differ from each other in the configuration of their contacts 14 and 15. Thus, FIG. 7 shows a further battery pack (for convenience identified at 13A), which differs from the above discussed battery pack 13 in having a different charge storage capacity and having a set of spring contacts 15A of length different (here about half the length) than the contacts 15 of the FIG. 6 battery pack 13. More particularly, the spring contacts 15A of FIG. 7 have their funnel-like mouth 33A located only about half way to the corresponding mouth 32 of their undercut groove 31.

Turning now in more detail to the battery charger 10, same here includes a side-by-side pair of battery receiving pockets 36 (FIG. 1) arranged in laterally spaced side-by-side relation. Each pocket 36 is defined by opposed grooves 40 and 41. The downward and rear opening groove 40 is in the cover 12. The groove 40 overlies and smoothly communicates with the front end portion of the upward and rear opening groove 41 in the base 11. As can be seen in FIG. 1, the groove 41 extends a substantial distance rearward from the overlying groove 40 and opens through the rear wall 42 of the base 11.

Each pocket 36, defined by the opposed top and bottom grooves 40 and 41, is shaped to receive either of the battery packs 13 and 13A forwardly slidably therein and to substantially complement the shape of the bottom and front ends of each battery pack. More particularly, the front end portion of the upfacing groove 41 in the base 11 has a stepped up portion 43 to be received in the forward and downward opening notch 26 in the front end portion of the battery pack 13. Spaced to the rear of the back wall 44 of the cover 12, each upfacing groove 41 has an outwardly and downwardly sloped portion 45, connecting a rear portion 46 of the upfacing groove 41 which is wider and deeper to a front groove portion 47 which is narrower and shallower. Thus, the groove portions 46 and 47 are able to snugly but easily slidably receive the rear and forward portions 22 and 21, respectively, of each battery pack 13. In this way each battery pack 13 is forwardly longitudinally insertable in each pocket 36 in the charger 10, as seen with respect to the fully inserted, rightward battery pack 13 of FIG. 1.

A horizontal guide plate 50 (FIGS. 1 and 2) extends in the forward/rearward direction of the downfacing groove 41 and protrudes slightly into the right side of the downfacing groove 40 in spaced relation above the stepped upper portion 43 of the upfacing groove 41. The guide plate 50 has a beveled corner 51 (FIG. 2) facing rearward and into the groove 40. The guide plate 50 is supported atop a boss 52 (FIG. 3) fixedly upstanding on the base 11 and is fixed thereto by screws 53.

Electrically conductive contact blades 54 and 55 and 55S extend fixedly upwardly through the stepped upper portion 43 of each upfacing groove 41. The blades 54 and 55 and 55S lie in vertical, forward/rearward rearward extending planes. The blade 54 is parallel to the blades 55 and 55S. The contact blade 54 is forwardly/rearwardly elongate and is spaced close to the rearwardly aligned and spaced, short blades 55 and 55S are spaced laterally between the elongate blade 54 and the left side of the corresponding pocket 36, in the manner shown in FIGS. 1, 2, and 3. The lateral spacing of the blade 54 from the blades 55 and 55S and of the blades 54 and 55 from the adjacent side edges of the grooves 40 and 41 corresponds to the laterally spacing spring contacts 30, and their undercut grooves 31, in the forward portion of each battery pack 13. Together the front and rear blades 55 and 55S extend forwardly/rearwardly about the same distance as the elongate blade 54. However, the blades 55 and 55S are spaced in the forward/rearward direction.

Thus, as a given battery pack 13 or 13A is inserted forwardly into a given rear facing pocket 36 of the charger, the long charger blade 54 is slidably received between and electrically contacts the leaf spring elements of the battery pack spring contact 14, while the rear, short charger blade 55 is slidably received between and electrically contacts the corresponding other long spring contact 15 or short spring contact 15A (FIGS. 6 and 7, respectively) of such battery pack 13 or 13A. The front short charger blade 55S is receivable by and can electrically contact only the long spring contact 15 of the high storage capacity battery pack 13 and not the short spring contact 15A of the low storage capacity battery pack 13A.

One side (the right side in FIG. 1 and the left side in FIG. 5) of each battery pack 13 or 13A has a longitudinal groove 57 (FIG. 5) in which to receive the exposed edge of the guide plate 50 to help guide the battery pack 13 properly into place in the forward end of the pocket 36.

Respective bottom lugs 56 of the blades 54 and 55 and 55S (FIG. 3) extend fixedly downward through the top wall of the stepped upper portion 43 and into the hollow interior of the charger base 11 for electrical connection to the charger circuit 60 (FIG. 8) therein, for charging the battery pack.

In the preferred embodiment shown, the rearward short blade 55 connects to the ground (negative) side of the charger circuit 60 and the elongate contact blade 54 is connected to the positive side of the FIG. 8 charger circuit 60.

In the embodiment shown, the FIG. 6 battery pack 13, with its longer spring contact 15, has a higher milliampere hour storage capability than the FIG. 7 battery pack 13A with its shorter spring contact 15A. In one embodiment, the battery packs 13 and 13A of FIGS. 6 and 7 were respectively of 1,000 milliampere hours and 500 milliampere hours storage capacity. Thus, for example, with a battery pack installed in a given pocket 36, failure of the battery pack to establish electrical contact with the forward short blade contact 55S means that it is the FIG. 7 (hence lower milliampere hour rated) battery pack 13A that is received in that pocket 36 at that time.

Turning now to FIG. 8, the charging circuit 60 comprises an electrical power input connection 61, here for example, a conventional connection to a conventional 110 volt AC electric power line. The electric power input 61 provides AC of desired voltage (e.g. by means of a step down transformer not shown) to a charging supply 62 and a separate control supply 63. The charging supply 62 and control supply 63 both provide DC current at a desired voltage. However, the outputs of the supplies 62 and 63 are independent of each other. Further, the charging supply 62 is to be capable of high enough current output for charging of the rechargeable battery packs 13. The con supply 63, on the other hand, is to be sufficiently regulated in its output voltage level as to reliably provide operating current to the control circuitry in the charging circuit.

Two identical battery current sources 65 and 66 (one for each of the two battery charging pockets 36 of FIG. 1) are for convenience labeled as BATT #1 and BATT #2, respectively.

The current source 65 receives DC charging current from the output 67 of the charging supply 62. If desired, normally conductive contacts of a failsafe relay 70 may be interposed between the charging supply current output 67 and the BATT #1 current source 65 to block charging current flow to the latter under one or more trouble conditions, but to normally allow such charging current flow. In the embodiment shown, the failsafe relay 70 is controlled by an output line 71 of the microprocessor 64. In the same way, charging current is normally supplied through further contacts of the failsafe relay 70 from the charging supply output 67 to the BATT #2 current source 66.

The BATT #1 current source 65 has positive and negative output lines 72 and 73 across which a given battery pack is connectable at a position BATT #1 for charging. Thus, in the embodiment shown, the positive and negative output lines 72 and 73 connect to abovementioned contact blades 54 and 55, respectively.

If desired, a suitable battery test circuit 74 may be connected across the lines 72 and 73 to test if a battery in the BATT #1 position is in condition to be used or be replaced. The battery test circuit 74 to apply a small load across the battery in the BATT #1 position after the battery has been fully charged. The droop in output voltage of the battery, i.e. the voltage of the battery after a given period of time under such load, provides a measure of battery capacity.

In the embodiment shown, rather than manually testing a battery at the BATT #1 position in this way, a microprocessor 64 can be programmed to apply a signal through a line 75 to the battery test unit 74 when it is desired to apply such a small test load to the battery at BATT #1 position. The voltage across the BATT #1 position appears across lines 76 and 77 connected to the positive and negative source current lines 72 and 73 respectively. The lines 76 and 77 connect to a pair of the several inputs of a conventional multiplexer 80. The multiplexer 80 conventionally periodically samples the voltage across the lines 76 and 77 and applies the corresponding amplitude voltage signal to a conventional voltage-to-frequency converter 81 which converts it to a corresponding digital signal which the microprocessor 64 reads as measure of said voltage droop. If the amount of voltage droop exceeds a suitable range stored in the microprocessor 64, the latter actuates a corresponding one of a plurality of status lights 82 (FIG. 1) displayed for view by the user of the charger 10, so that the user will recognize that this particular battery in the BATT #1 pocket, is defective and should be replaced. On the other hand if such voltage droop is small enough, the microprocessor 64 can be programmed to charge the battery.

The BATT #1 current source 65 here has an output signal line 83, carrying a signal corresponding to the charging current amplitude applied to a battery at the BATT #1 position in the charger. This signal is passed to the multiplexer 80, which periodically causes the voltage-to-frequency converter 81 to apply a corresponding digital signal to the microprocessor 64. The microprocessor 64 therefore can monitor the charging current level in the BATT #1 current source 65 and determine whether it is within desired limits.

If desired, the microprocessor 64 can operate through an output signal line 84 to shut off the BATT #1 current source 65 if the current therethrough is outside the desired range.

Also if desired, if the BATT #1 current source 65 fails to shut off upon receiving such a shut off signal on the line 84, the microprocessor 64 can through line 71 actuate the failsafe relay 70 to open the contacts thereof and thus disconnect the output 67 of the charging supply 62 from the BATT #1 current source 65.

In the embodiment shown, the charger 10 is provided with two battery pockets 36 so as to enable it to simultaneously charge two battery packs 13 or 13A. To this end, the second battery current source 66 is connected and operates in the same manner above described with respect to the first battery current source 65.

For example, the second battery current source 66 has positive and negative output lines 72' and 73' connected to corresponding positive and negative blades 54' and 55' as well as to corresponding inputs of the battery test unit 74 above discussed. Similarly, lines 76' and 77' connect the positive and negative current source output lines 72' and 73' to corresponding inputs of the multiplexer 80. The multiplexer 80 thus periodically samples the potential across lines 76' and 77' and through the voltage-to-frequency converter 81 feeds corresponding digital signals to the microprocessor 64 to reject or recharge the battery at the BATT #2 position as it does the battery at the BATT #1 position. The microprocessor can thus monitor, on a time sharing basis, the outputs of first and second battery current sources 65 and 66.

In addition, the BATT #2 current source 66 preferably also has an output signal line 83' to the multiplexer 80 and thence to the voltage-to-frequency converter 81 and microprocessor 64 so that the latter can monitor the charging current through BATT #2 current source 66, on a time share basis.

The BATT #2 current source 66 may also be connected to a signal line 84' from the microprocessor 64 to enable the microprocessor 64 to shut off the BATT #2 current source 66 if the current flow therethrough is outside the desired range. Also, should the BATT #2 current source 66 fail to shut off upon command on line 84' from the microprocessor 64, the microprocessor 64 can then act through the line 71 to shut off the failsafe relay 70 and thereby disconnect both the BATT #1 and BATT #2 current sources from the output line 67 of the charging supply 62.

The status lights 82 include, for each battery pocket 36, a first lamp which illuminates during charging (marked CHG in FIG. 1), a lamp illuminated when the battery has been charged and is ready for use (indicated at RDY in FIG. 1) and a further lamp illuminated to show the battery needs replacement (marked REPL in FIG. 1).

In addition, if desired, a single further lamp 82 may be provided to illuminate when the charger is receiving power at the power input 61.

To the extent above described, the charger circuit 60 of FIG. 8 may be conventional, for example similar to that provided in various of the above-mentioned Series 298 chargers marketed by the assignee of the present invention.

Turning now more particularly to the portion of the charger circuit 60 of FIG. 8 more specifically involving the present invention, the forward one (at 55S in FIG. 1) of the short blades in each battery pocket 36 is used to sense which one of the two types of battery packs 13 and 13A is plugged into that pocket 36 at a given moment, namely to detect whether the battery pack being inserted is of high storage capability, requiring a higher charging current, or instead is of low charge storage capability and requires a lower charging current. The sensing blades are individually indicated in FIG. 8 at 55S and 55S' for the respective pockets 36 and 36' (FIG. 1), and are labeled BATT PACK SENSE #1 and #2 in FIG. 8. A line 90 from the sensing blade 55S connects through a resistor R11 to a positive voltage supply +5V (for example a positive 5 volt line from the control supply 63) and through a resistor R10 to an input line 91 to the microprocessor 64. A capacitor C15 connects between line 91 and the ground side of the control supply 63 to prevent false transient signals from influencing the operation of the microprocessor 64.

Inserting a battery pack 13, of FIG. 6 type, in either charger pocket, say pocket 36, results in its longer spring contact 15 electrically contacting both the rearward charging blade 55 and the forward sensing blade 55S in the corresponding pocket 36. This applies the negative or ground potential of the charging contact 55 to the sensing contact 55S and line 90 as permitted by the pullup resistor R11. Thus, the input line 91 of the microprocessor 64 is now switched low. The microprocessor 64 thus recognizes that the battery pack 13 inserted into the pocket 36 is of the FIG. 6 type, for example a battery pack of higher charge capacity and which requires a higher charging current. Accordingly, the microprocessor 64 signals through a line 92 to the BATT #1 current source 65 that it should charge the battery in its pocket at the higher charging rate, for example at a 1.75 ampere current.

On the other hand, if a battery pack 13A (FIG. 7) is inserted into either pocket, say pocket 36, of the charger, its shorter spring contact 15A will not extend into contact with the sensing blade 55S of the charger. Thus, the sensing blade 55S stays out of electrical contact with the negative blade 55 spaced to the rear thereof. Accordingly, the lines 90 and 91 remain at the positive (here for example +5 volts) voltage set at the top of resistor R11. The resulting high on the input line 91 causes the microprocessor 64 to apply a different signal through the line 92 to the BATT #1 current source 65, causing the latter to apply charging current at a lower rate, for example 1 ampere, to the battery pack 13A in corresponding pocket 36 in the charger.

The pocket 36' for a second battery 13', labeled BATT #2 in FIG. 8, is similarly provided with a sensing blade 55S', line 90', resistors R10' and R11', capacitor C15', and lines 91' and 92', to operate as described above with respect to sensing contact 55S.

MODIFICATION

Figure 9:
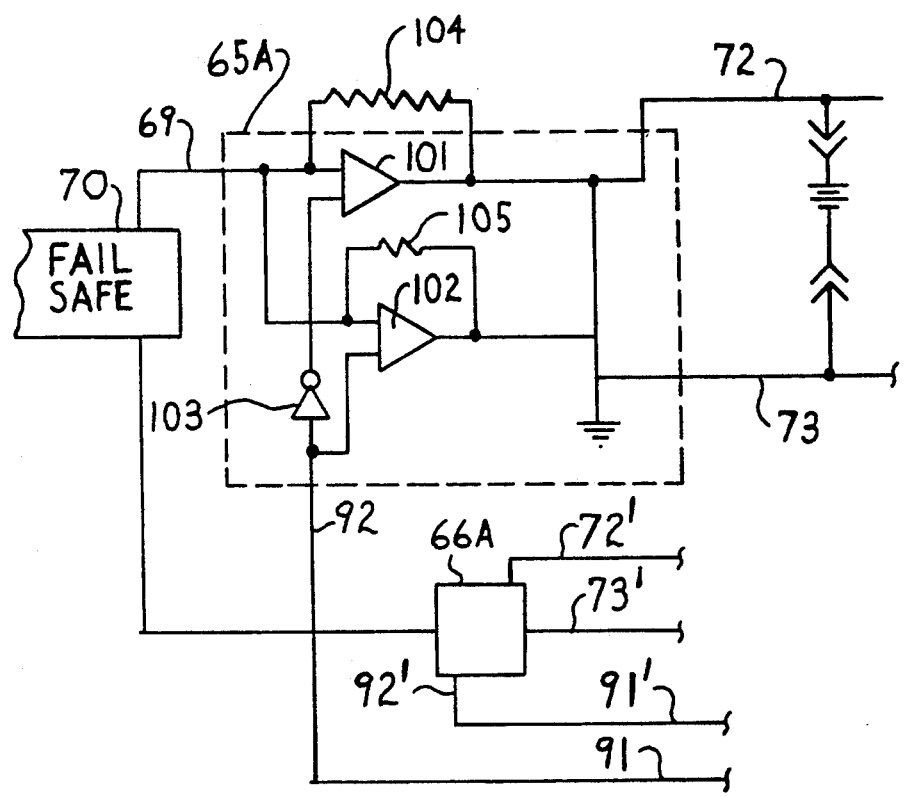
FIG. 9 is a fragment of FIG. 8 but showing a modification.

Although a suitably programmed microprocessor 64 can be employed as above described to provide the switching of a given battery current source 65 or 66 from a high charging rate (for example 1.75 ampere) upon sensing of a high storage capacity battery pack 13 or to a low charging rate (for example 1 ampere) upon sensing of a lower capacity battery pack 13A in the same charger pocket 36, discreet hardwired circuitry can be substituted for the microprocessor 64. More particularly, see for example the modification in FIG. 9, wherein the line 91 connects directly to a line 92 leading to a modified BATT #1 charging current source 65A. In FIG. 9, charging current from the failsafe unit 70 is applied through line 69 to the modified charging current source 65A and more particularly to main current inputs of current on/off switching devices 101 and 102 of any convenient kind, here illustrated by conventional operational amplifiers of sufficient current handling capability. The voltage level on line 91 is applied to line 92 and thence through an invertor 103 to the control input of current switching device 101, and directly (without inversion) to the control electrode of current switching device 102. The outputs of current switching devices 101 and 102 connect to the positive current output line 72 of the modified current source 65A. The current outputs of the current switching devices 101 and 102, when turned on, are set at the desired respective greater and lesser amperage values, here the above-mentioned 1.75 and 1.0 ampere levels by any convenient means. Here, for example, the current switching devices 101 and 102 have respective larger and smaller negative feedback resistors 104 and 105 each connected from current output to current input of the respective current switching device to control the current gain thereof.

Thus, with a low or ground potential on the line 91, signalling that a high storage capacity battery pack 13 is installed in the corresponding charger pocket 36, such low is applied to the current switching device 102 to shut same off and is inverted by the invertor 103 to turn on the current switching device 101 so as to apply charging current at the desired higher level through the line 72 to the battery 13 in the corresponding charger pocket 36.

On the other hand, if a low capacity battery pack 13A is in such charger pocket 36, the potential on lines 91 and 92 is high which directly turns on the current switching device 102 to flow charging current through the positive potential current line 72 to the battery 13A in the pocket 36 at the desired lower level, to correspond to the smaller charging capacity of such battery. On the other hand, the invertor 103 inverts the high voltage level on line 92 and applies a low to the control input of the current switching device 101 to turn same off.

A modified BATT #2 charging current source 66A may be similar to above-described source 65A.

Accordingly, to summarize the operation of the apparatus of FIGS. 1-9, and particularly as to the portion thereof directly involving the present invention, insertion of a battery pack 13 or 13A in a given charging pocket 36 of the battery charger 10, renders the voltage level on the corresponding sensing blade 55S either low or high and, as a result, through the line 91 and 92, sets the corresponding battery current source 65 to the appropriate high or low charging current level, corresponding to the respective high or low current storage capacity of the battery pack 13 or 13A inserted in the charging pocket 36. In this way, the charging time will be approximately the same, for example about an hour, regardless of whether the inserted battery pack 13 or 13A is of high or low charge capacity.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, first and second rechargeable batteries of different ampere hour charge storage capability for different ones of a family of battery powered surgical tools, and a battery charger for charging said first and second batteries at different charge current flow rates, wherein:

said battery charger has first and second polarity charging contacts and sensor means having different states;

said first battery has first contact means for receiving charging current from said charging contacts, including means for causing said sensor means to be in a first said state;

said second battery having second contact means for receiving charging current from said charging contacts, including means for causing said sensor means to be in a second said state;

said battery charger further having means responsive to the state of said sensor means for charging said first and second batteries at said different charging current flow rates wherein, on said batteries, said first and second contact means each include a first polarity contact and a second polarity contact, said causing means on said first battery comprising a blank area adjacent said second polarity contact, said causing means on said second battery comprising an extension of said second polarity contact.

2. The apparatus of claim 1 wherein, on said charger, said sensor means comprises a further contact positioned adjacent said second polarity charging contact for engagement by said extension on said second battery and for occupying said blank area on said first battery.

3. In combination, first and second rechargeable batteries of different ampere hour charge storage capability for different ones of a family of battery powered surgical tools, and a battery charger for charging said first and second batteries at different charge current flow rates, wherein:

said battery charger has first and second polarity charging contacts and sensor means having different states;

said first battery has first contact means for receiving charging current from said charging contacts, including means for causing said sensor means to be in a first said state;

said second battery having second contact means for receiving charging current from said charging contacts, including means for causing said sensor means to be in a second said state;

said battery charger further having means responsive to the state of said sensor means for charging said first and second batteries at said different charging current flow rates, in which said charger includes means for normally maintaining said sensor means at a first voltage level, said second polarity charging contact of said battery charger being normally at a second voltage level different from said first voltage level, said causing means on said second battery comprising a conductor simultaneously engageable with said sensor means and said second polarity charging contact of said battery charger for shorting said sensor means to said second polarity charging contact and therewith shifting said sensor means from said normal first voltage level to said second voltage level, said normal first voltage level defining said first state of said sensor means, said second voltage level defining said second state of said sensor means.

4. A battery charger for charging first and second batteries at different charge flow rates, said first and second batteries being of different ampere hour charge storage capability for different ones of a family of battery powered surgical tools, the battery charger comprising:

means for alternative reception of batteries to be charged at different charging rates;

spaced first and second charging contacts exposed in said reception means for charging engagement of a battery, said second charging contact being shorter than said first charging contact;

a sensor contact exposed in said reception means and being arranged parallel to and spaced from said first charging contact, said sensor contact being aligned with and spaced from said second charging contact;

first circuit means for holding said sensor contact normally at a voltage level different from the voltage level of said second contact;

second circuit means responsive to shorting of said sensor contact to said second charging contact by a battery in said reception means for shifting said sensor contact substantially to said voltage level of said second contact;

third circuit means responsive to said first and second circuit means for charging a battery alternatively at first and second charging rates dependent on which of said two voltage levels appears on said sensor contact.

5. The apparatus of claim 4 in which said first circuit means comprises a fixed voltage source at said normal voltage level and dropping resistor means connecting said fixed voltage source to said sensor contact for normally holding said sensor contact at said normal voltage level and for allowing said sensor contact to shift to said voltage level of said second contact upon being shorted thereto, 6. The apparatus of claim 3 in which said spaced first and second charging contacts are blades which are elongate and short, respectively, and are in parallel, said sensor contact being a blade aligned with said short charging blade and spaced therefrom, said short charging blade and sensor blade being opposed to said elongate charging blade, said blades being located in and aligned longitudinally in a pocket in the charger, said sensor blade being deeper in the pocket than said short charging blade, such that a battery encounters said short and long charging blades before it can encounter said sensing blade.

* * * * *